United States Patent
Lee et al.

(10) Patent No.: US 11,161,929 B2
(45) Date of Patent: Nov. 2, 2021

(54) THERMOPLASTIC POLYURETHANE FILM AND PREPARATION METHOD THEREOF

(71) Applicant: LG Chem, Ltd., Seoul (KR)

(72) Inventors: Sang Yool Lee, Daejeon (KR); Joo Hee Hong, Daejeon (KR); Se Jung Park, Daejeon (KR); Sang Hwan Kim, Daejeon (KR); Jang Soon Kim, Daejeon (KR)

(73) Assignee: LG Chem, Ltd.

( * ) Notice: Subject to any disclaimer, the term of this patent is extended or adjusted under 35 U.S.C. 154(b) by 41 days.

(21) Appl. No.: 16/490,757

(22) PCT Filed: Mar. 16, 2018

(86) PCT No.: PCT/KR2018/003066
§ 371 (c)(1),
(2) Date: Sep. 3, 2019

(87) PCT Pub. No.: WO2018/169334
PCT Pub. Date: Sep. 20, 2018

(65) Prior Publication Data
US 2020/0079893 A1    Mar. 12, 2020

(30) Foreign Application Priority Data

Mar. 17, 2017    (KR) ................. 10-2017-0033596

(51) Int. Cl.
| | | |
|---|---|---|
| *C08G 18/44* | (2006.01) | |
| *C08G 18/32* | (2006.01) | |
| *C08G 18/12* | (2006.01) | |
| *C08G 18/24* | (2006.01) | |
| *C08G 18/66* | (2006.01) | |
| *C08G 18/75* | (2006.01) | |
| *C08J 5/18* | (2006.01) | |
| *C08G 18/08* | (2006.01) | |

(52) U.S. Cl.
CPC ......... *C08G 18/12* (2013.01); *C08G 18/0852* (2013.01); *C08G 18/246* (2013.01); *C08G 18/3206* (2013.01); *C08G 18/44* (2013.01); *C08G 18/664* (2013.01); *C08G 18/755* (2013.01); *C08G 18/758* (2013.01); *C08J 5/18* (2013.01); *C08J 2375/04* (2013.01)

(58) Field of Classification Search
CPC ...... C08J 5/18; C08G 18/0852; C08G 18/246; C08G 18/3206; C08G 18/44; C08G 18/664; C08G 18/755; C08G 18/758
See application file for complete search history.

(56) References Cited

U.S. PATENT DOCUMENTS

| | | | |
|---|---|---|---|
| 2009/0269568 A1* | 10/2009 | Kuhlmann | ........... C08G 18/673 428/220 |
| 2014/0295181 A1* | 10/2014 | Minomo | .............. C09D 175/06 428/354 |

FOREIGN PATENT DOCUMENTS

| | | | | |
|---|---|---|---|---|
| CN | 104885215 A | 9/2015 | | |
| JP | H04153209 A | 5/1992 | | |
| JP | 10008383 A | * 1/1998 | ............... | D06N 3/14 |
| JP | H108383 A | 1/1998 | | |
| JP | H10130615 A | 5/1998 | | |
| JP | 2003-313330 A | 11/2003 | | |
| JP | 2004230749 A | 8/2004 | | |
| JP | 2016204554 A | 12/2016 | | |
| KR | 100719433 B1 | 5/2007 | | |
| KR | 2011-0008884 A | 1/2011 | | |
| KR | 2015-0119850 A | 10/2015 | | |
| TW | 201435039 A | 9/2014 | | |
| WO | WO-2005080062 A1 | * 9/2005 | ........... | C09D 175/04 |

OTHER PUBLICATIONS

WO-2005080062_Sep. 2005_English Translation.*
JP-10008383-A_Jan. 1998_English Translation.*
Search Report from International Application No. PCT/KR2018/003066, dated Jun. 27, 2018.
Search Report from Chinese Office Action for 201880009119.1 dated Jan. 28, 2021; 3 pages.

* cited by examiner

*Primary Examiner* — Michael L Leonard
(74) *Attorney, Agent, or Firm* — Lerner, David, Littenberg, Krumholz & Mentlik, LLP

(57) ABSTRACT

A thermoplastic polyurethane film including a cured product of a polyurethane resin composition is provided. The polyurethane resin composition includes a polyurethane resin, a first isocyanate-based curing agent, and an organic solvent. The thermoplastic polyurethane film has a tensile strength of 0.2 MPa to 1.5 MPa at an initial elongation of 5% to 10%. A method for preparing the thermoplastic polyurethane film is also provided.

10 Claims, No Drawings

THERMOPLASTIC POLYURETHANE FILM AND PREPARATION METHOD THEREOF

CROSS-REFERENCE TO RELATED APPLICATIONS

This application is a national phase entry under 35 U.S.C. § 371 of International Application No. PCT/KR2018/003066, filed Mar. 16, 2018, which claims priority to Korean Patent Application No. 10-2017-0033596, filed Mar. 17, 2017, the entire contents of which are incorporated herein by reference.

TECHNICAL FIELD

The present invention relates to a thermoplastic polyurethane film having low stress at an initial elongation, and a preparation method thereof.

BACKGROUND ART

A thermoplastic polyurethane (TPU) film is excellent in mechanical properties such as strength, stretch characteristics, toughness, and abrasion resistance, and thus has been mainly used in the automobile field.

In general, a polyurethane solution is prepared by dissolving an extruded and molded polyurethane pellet in a solvent, and a thermoplastic polyurethane film is prepared by applying the polyurethane solution onto a substrate. However, since a polyurethane pellet having a high molecular weight is not dissolved well in a solvent, a content of a solid content of a polyurethane solution prepared is about 15% or less, which is a low value. Since a polyurethane solution having a low content of the solid content may not be applied onto a substrate to have a predetermined thickness or more, there is a problem in that it is difficult to prepare a thick polyurethane film. Further, since it is difficult to carry out an additional polymerization reaction on a polyurethane pellet, there are problems in that it is not easy to control physical properties of a thermoplastic polyurethane film prepared from a polyurethane solution, and it is necessary to use a highly toxic solvent in order to dissolve a polyurethane pellet having a high molecular weight.

Meanwhile, in order to apply a thermoplastic polyurethane film to parts of an automobile, engineering parts, and the like, a process of processing the thermoplastic polyurethane film into a curved surface, and the like is required. Thus, there is a need for a thermoplastic polyurethane film which has a larger thickness and is easily processed.

DETAILED DESCRIPTION OF THE INVENTION

Technical Problem

The present invention has been made in an effort to provide a thermoplastic polyurethane film which has a large thickness and is easily processed due to low stress at an initial elongation, and a preparation method thereof.

However, a technical problem to be solved by the present invention is not limited to the aforementioned problem, and the other problems that are not mentioned may be clearly understood by a person skilled in the art from the following description.

Technical Solution

An exemplary embodiment of the present invention provides a thermoplastic polyurethane film including: a cured product of a polyurethane resin composition which includes a polyurethane resin, a first isocyanate-based curing agent, and an organic solvent, in which the thermoplastic polyurethane film has a tensile strength of 0.2 MPa to 1.5 MPa at an initial elongation of 5% to 10%.

Another exemplary embodiment of the present invention provides a method for preparing a thermoplastic polyurethane film, the method including: preparing a polyurethane resin composition including a polyurethane resin, a first isocyanate-based curing agent, and an organic solvent; forming a polyurethane resin layer by applying the polyurethane resin composition onto a substrate film and heat-treating the polyurethane resin composition; and additionally curing the polyurethane resin layer.

Advantageous Effects

The thermoplastic polyurethane film according to an exemplary embodiment of the present invention has a tensile strength of 0.2 MPa to 1.5 MPa at an initial elongation of 5% to 10%, and has an advantage in that the processability thereof is excellent due to low stress at an initial elongation.

The method for preparing a thermoplastic polyurethane film according to an exemplary embodiment of the present invention may prepare a thermoplastic polyurethane film which is easily processed due to low stress at an initial elongation.

The effects of the present invention are not limited to the above-described effects, and effects, which are not mentioned, will be clearly understood by a person skilled in the art from the specification of the present application and the accompanying drawings.

BEST MODE

Throughout the specification of the present application, when one part "includes" one constituent element, unless otherwise specifically described, this does not mean that another constituent element is excluded, but means that another constituent element may be further included.

Throughout the specification of the present application, when one member is disposed "on" another member, this includes not only a case where the one member is brought into contact with another member, but also a case where still another member is present between the two members.

Throughout the specification of the present application, the unit "wt %" may mean a weight ratio of a component included in a member based on the total weight of the member.

Throughout the specification of the present application, the unit "part by weight" may mean a weight ratio between the respective components.

Throughout the specification of the present application, the term "polymerization unit" may mean a form in which monomers react in a polymer, and specifically, may mean a form in which the polymer is subjected to a polymerization reaction to form a skeleton of the polymer, for example, a main chain or a side chain.

Throughout the specification of the present application, "a weight average molecular weight" and "a number average molecular weight" of a compound may be calculated by using a molecular weight and a molecular weight distribution of the compound. Specifically, a sample specimen in which a concentration of a compound is 1 wt % is prepared by putting tetrahydrofuran (THF) and the compound into a 1-ml glass bottle, a standard specimen (polystyrene) and the sample specimen are filtered through a filter (pore size of 0.45 mm), and then the elution time of the sample specimen is compared with the calibration curve of the standard specimen by injecting the specimens into a GPC injector, thereby obtaining the molecular weight and the molecular weight distribution of the compound. In this case, Infinity II 1260 (manufactured by Agilent Inc.) may be used as a measuring apparatus, and the flow rate and the column temperature may be set to 1.00 mL/min and 40.0° C., respectively.

Hereinafter, the present specification will be described in more detail.

An exemplary embodiment of the present invention provides a thermoplastic polyurethane film including: a cured product of a polyurethane resin composition which includes a polyurethane resin, a first isocyanate-based curing agent, and an organic solvent, in which the thermoplastic polyurethane film has a tensile strength of 0.2 MPa to 1.5 MPa at an initial elongation of 5% to 10%.

The thermoplastic polyurethane film according to an exemplary embodiment of the present invention has a tensile strength of 0.2 MPa to 1.5 MPa at an initial elongation of 5% to 10%, and has an advantage in that the processability thereof is excellent due to low stress at an initial elongation.

According to an exemplary embodiment of the present invention, the thermoplastic polyurethane film may have a tensile strength of 0.2 MPa to 0.5 MPa at an elongation of 5% and a tensile strength of 0.4 MPa to 1.5 MPa at an elongation of 10%. Specifically, the thermoplastic polyurethane film may have a tensile strength of 0.25 MPa to 0.45 MPa, 0.3 MPa to 0.4 MPa, 0.2 MPa to 0.3 MPa, or 0.35 MPa to 0.45 MPa at an elongation of 5%. Further, the thermoplastic polyurethane film may have a tensile strength of 0.5 MPa to 1.25 MPa, 0.7 MPa to 1.1 MPa, 0.4 MPa to 0.7 MPa, or 0.85 MPa to 1.25 MPa at an elongation of 10%. Accordingly, the thermoplastic polyurethane film may be easily processed through a relatively small external force, due to a small tensile strength at an initial elongation.

According to an exemplary embodiment of the present invention, the thermoplastic polyurethane film may have excellent durability. Specifically, the thermoplastic polyurethane film may have a tensile strength at break of MPa to 45 MPa. The thermoplastic polyurethane film satisfying a tensile strength at break within the above-described range has an advantage in that absorption of impact from external force and durability are excellent.

Accordingly, the thermoplastic polyurethane film may have excellent processability due to a low tensile strength at an initial elongation, and may have excellent durability due to a high tensile strength at break.

According to an exemplary embodiment of the present invention, a content of the first isocyanate-based curing agent may be 2.5 parts by weight to 5 parts by weight or 3 parts by weight to 5 parts by weight, based on 100 parts by weight of the polyurethane resin. By adjusting the content of the first isocyanate-based curing agent within the above-described range, it is possible to implement a thermoplastic polyurethane film having a tensile strength of 0.2 MPa to 1.5 MPa at an initial elongation of 5% to 10%. That is, by adjusting the content of the first isocyanate-based curing agent in the polyurethane resin composition within the above-described range, it is possible to implement a thermoplastic polyurethane film having excellent processability.

According to an exemplary embodiment of the present invention, the first isocyanate-based curing agent may include two to six isocyanate functional groups. For example, the first isocyanate-based curing agent may include at least one of H12MDI which is a bifunctional isocyanate-based curing agent manufactured by Evonik Industries, MHG-80B which is a hexafunctional isocyanate-based curing agent manufactured by Asahi Kasei Chemicals Corporation, MFA-100 which is a hexafunctional isocyanate-based curing agent manufactured by Asahi Kasei Chemicals Corporation, and TKA-100 which is a trifunctional isocyanate-based curing agent manufactured by Asahi Kasei Chemicals Corporation.

According to an exemplary embodiment of the present invention, the polyurethane resin may be a copolymer of a mixture including: a polyol having a number average molecular weight of 1,800 g/mol to 2,200 g/mol; a chain extender including a diol having 4 to 10 carbon atoms; and a second isocyanate-based curing agent.

According to an exemplary embodiment of the present invention, the polyurethane resin may be a block copolymer including a soft segment and a hard segment. Specifically, the soft segment of the polyurethane resin may include a polymerization unit derived from the polyol and the second isocyanate-based curing agent, and the hard segment of the polyurethane resin may include a polymerization unit derived from the chain extender and the second isocyanate-based curing agent.

According to an exemplary embodiment of the present invention, the polyol may have a number average molecular weight of 1,800 g/mol to 2,200 g/mol, 1,950 g/mol to 2,050 g/mol, or 1,900 g/mol to 2,100 g/mol. When the number average molecular weight of the polyol is within the above-described range, a thermoplastic polyurethane film having excellent processability may be implemented due to a low tensile strength at an initial elongation. Further, by adjusting the number average molecular weight of the polyol within the above-described range, it is possible to suppress the elongation of the thermoplastic polyurethane film from being decreased.

According to an exemplary embodiment of the present invention, the polyol may include a diol containing two hydroxyl groups. Specifically, the polyol may include one or more of polycarbonate diol, polycaprolactone diol, polyester diol, and polyether diol.

According to an exemplary embodiment of the present invention, a content of the polyol may be 60 wt % to 75 wt % based on the weight of the mixture. Specifically, the content of the polyol may be 62.5 wt % to 73 wt %, 65 wt % to 71 wt %, or 68 wt % to 74.5 wt %, based on the weight of the mixture. By adjusting the content of the polyol in the mixture within the above-described range, a thermoplastic polyurethane film having a low tensile strength at an initial elongation may be prepared. Further, by adjusting the content of the polyol within the above-described range, a content of a hard segment included in the polyurethane resin is suppressed from being excessively increased, so that it is possible to prevent a tensile strength at an initial elongation of the thermoplastic polyurethane film from being increased.

According to an exemplary embodiment of the present invention, the chain extender may include a diol having 4 to 10 carbon atoms, or a diol having 4 to 6 carbon atoms. A chain extender including the diol having carbon atoms within the above-described range may effectively extend the chains of the second isocyanate-based curing agent. Specifically, the chain extender may include at least one of 1,4-butanediol, 1,5-pentanediol, 1,6-hexanediol, neopentyl glycol, 1,10-decanediol, 1,1-cyclohexanedimethanol, and 1,4-cyclohexanedimethanol.

According to an exemplary embodiment of the present invention, a content of the chain extender may be 5 wt % to 10 wt %, specifically, 5 wt % to 8 wt %, or 6 wt % to 7.5 wt %, based on the weight of the mixture. By adjusting the content of the chain extender in the mixture within the above-described range, the weight average molecular weight of the polyurethane resin may be improved, and a tensile strength at an initial elongation of the thermoplastic polyurethane film may be suppressed from being increased.

According to an exemplary embodiment of the present invention, the second isocyanate-based curing agent may include two to six isocyanate functional groups. Specifically, the second isocyanate-based curing agent may include two isocyanate functional groups. For example, the second isocyanate-based curing agent may include at least one of isophorone diisocyanate (IPDI), methylenediphenyl-4,4'-diisocyanate, 4,4'-methylenebiscyclohexyl diisocyanate, xylene diisocyanate (XDI), naphthalene-1,5-diisocyanate, and cyclohexane diisocyanate.

According to an exemplary embodiment of the present invention, a content of the second isocyanate-based curing agent may be 20 wt % to 30 wt % based on the weight of the mixture. Specifically, the content of the second isocyanate-based curing agent may be 20.5 wt % to 27.5 wt %, wt % to 25 wt %, or 22.5 wt % to 25 wt %, based on the weight of the mixture. By adjusting the content of the second isocyanate-based curing agent within the above-described range, a polymerization reaction of the polyurethane resin may be stably carried out, and a thermoplastic polyurethane film having low stress at an initial elongation may be prepared.

According to an exemplary embodiment of the present invention, the mixture may further include a catalyst. As the catalyst, a catalyst used in the art may be used without limitation, and for example, dibutyltin dilaurate (DBTDL) may be used. Further, the content of the catalyst may be 0.005 part by weight to 0.02 part by weight or 0.008 part by weight to 0.015 part by weight, based on 100 parts by weight of the mixture.

According to an exemplary embodiment of the present invention, the polyurethane resin may have the weight average molecular weight of 40,000 g/mol to 70,000 g/mol. By adjusting the weight average molecular weight of the polyurethane resin, physical properties of the thermoplastic polyurethane film such as tensile strength and durability may be easily controlled.

According to an exemplary embodiment of the present invention, the organic solvent may include at least one of acetone, methyl ethyl ketone, methyl isobutyl ketone, cyclohexane, toluene, xylene, ethylene glycol monomethyl ether (methyl cellosolve), and ethylene glycol monoethyl ether (ethyl cellosolve).

According to an exemplary embodiment of the present invention, a content of the organic solvent may be 30 parts by weight to 80 parts by weight based on 100 parts by weight of the polyurethane resin. By adjusting the content of the organic solvent within the above-described range, a content of a solid content of the polyurethane resin composition may be controlled, and coatability of the polyurethane resin composition may be improved.

According to an exemplary embodiment of the present invention, a content of a solid content of the polyurethane resin composition may be 20% to 70%, specifically, 30% to 60%, or 40% to 55%. In the present specification, the "solid content" may mean a solute or a solid material except for the solvent in the entire solution, and specifically, the solid content of the polyurethane resin composition may collectively refer to the polyurethane resin, the first isocyanate-based curing agent, and an additive such as the catalyst, except for the organic solvent. When the content of the solid content of the polyurethane resin composition is within the above-described range, the polyurethane resin composition may be applied thickly onto a substrate, and accordingly, a thermoplastic polyurethane film having a large thickness may be prepared.

According to an exemplary embodiment of the present invention, the thermoplastic polyurethane film may have a thickness of 10 μm to 250 μm. Specifically, the thermoplastic polyurethane film may have a thickness of 20 μm to 200 μm, or 30 μm to 180 μm. That is, the thermoplastic polyurethane film may have a large thickness, as compared to an existing polyurethane film.

Another exemplary embodiment of the present invention provides a method for preparing a thermoplastic polyurethane film, the method including: preparing a polyurethane resin composition including a polyurethane resin, a first isocyanate-based curing agent, and an organic solvent; forming a polyurethane resin layer by applying the polyurethane resin composition onto a substrate film and heat-treating the polyurethane resin composition; and additionally curing the polyurethane resin layer.

The method for preparing a thermoplastic polyurethane film according to an exemplary embodiment of the present invention may prepare a thermoplastic polyurethane film which is easily processed due to low stress at an initial elongation. Specifically, the thermoplastic polyurethane film prepared by the method for preparing a thermoplastic polyurethane film may have a tensile strength of 0.2 MPa to 1.5 MPa at an initial elongation of 5% to 10%. The thermoplastic polyurethane film satisfying a tensile strength at an initial elongation within the above-described range has an advantage in that the processability thereof is excellent.

According to an exemplary embodiment of the present invention, a content of the first isocyanate-based curing agent may be 2.5 parts by weight to 5 parts by weight or 3 parts by weight to 5 parts by weight, based on 100 parts by weight of the polyurethane resin. By adjusting the content of the first isocyanate-based curing agent within the above-described range, the tensile strength at an initial elongation of the thermoplastic polyurethane film may be effectively lowered.

According to an exemplary embodiment of the present invention, a content of a solid content of the polyurethane resin composition may be 20% to 70%, specifically, 30% to 60%, or 40% to 55%. When the content of the solid content of the polyurethane resin composition is within the above-described range, the polyurethane resin composition may be applied thickly onto a substrate, and accordingly, a thermoplastic polyurethane film having a large thickness may be prepared.

According to an exemplary embodiment of the present invention, the polyurethane resin used for the method for preparing a thermoplastic polyurethane film may be prepared by carrying out a copolymerization reaction of a mixture, which includes: a polyol having a number average molecular weight of 1,800 g/mol to 2,200 g/mol; a chain extender including a diol having 4 to 10 carbon atoms; and a second isocyanate-based curing agent, in an organic solvent.

In addition, the polyol, the chain extender, the first isocyanate-based curing agent, the second isocyanate-based curing agent, the organic solvent, the catalyst, and the like, which are used for the method for preparing a thermoplastic polyurethane film, may be the same as the polyol, the chain extender, the first isocyanate-based curing agent, the second isocyanate-based curing agent, the organic solvent, the catalyst, and the like in the thermoplastic polyurethane film.

According to an exemplary embodiment of the present invention, the number of carbon atoms constituting a diol used as the chain extender is less than the number of carbon atoms constituting the polyol, so that the diol in the mixture has a higher fluidity than that of the polyol. Thereby, in the mixture, a reaction of the chain extender and the second isocyanate-based curing agent may occur earlier than a reaction of the polyol and the second isocyanate-based curing agent. Specifically, when butanediol is used as the chain extender, one hydroxyl group of two hydroxyl groups of the butanediol reacts with and is bonded to an isocyanate group of the second isocyanate-based curing agent, and while a process of bonding an unreacted hydroxyl group of the butanediol to a new isocyanate group of the second isocyanate-based curing agent is repeated, a second isocyanate-based curing agent having a long extended chain structure may be formed. Thereafter, a second isocyanate-based curing agent having a long extended chain structure may react with the polyol to form a polyurethane resin having an increased weight average molecular weight.

According to an exemplary embodiment of the present specification, the copolymerization reaction for preparing a polyurethane resin may be carried out at a temperature of 50° C. to 70° C. By adjusting the copolymerization reaction temperature within the above-described range, the polyurethane resin may be stably polymerized, and the polyurethane resin may be polymerized at a relatively low temperature, so that preparation cost and preparation time of the thermoplastic polyurethane film may be reduced.

According to an exemplary embodiment of the present invention, the content of the polyol may be 60 wt % to 75 wt %, 62.5 wt % to 73 wt %, 65 wt % to 71 wt %, or 68 wt % to 74.5 wt %, based on the weight of the mixture. By adjusting the content of the polyol in the mixture within the above-described range, a polymerization reaction of the polyurethane resin may be stably carried out, and a thermoplastic polyurethane film having a low tensile strength at an initial elongation may be prepared.

According to an exemplary embodiment of the present invention, a content of the chain extender may be 5 wt % to 10 wt %, 5 wt % to 8 wt %, or 6 wt % to 7.5 wt %, based on the weight of the mixture. By adjusting the content of the chain extender in the mixture within the above-described range, the weight average molecular weight of the polyurethane resin may be improved, and a tensile strength at an initial elongation of the thermoplastic polyurethane film may be suppressed from being increased.

According to an exemplary embodiment of the present invention, a content of the second isocyanate-based curing agent may be 20 wt % to 30 wt %, 20.5 wt % to 27.5 wt %, 20 wt % to 25 wt %, or 22.5 wt % to 25 wt %, based on the weight of the mixture. By adjusting the content of the second isocyanate-based curing agent within the above-described range, a polymerization reaction of the polyurethane resin may be stably carried out, and a thermoplastic polyurethane film having low stress at an initial elongation may be prepared.

According to an exemplary embodiment of the present invention, the mixture may further include a catalyst. Through the catalyst, a polymerization reaction of the polyurethane resin and a reaction of the polyurethane resin with the first isocyanate-based curing agent may be promoted. A content of the catalyst may be 0.005 part by weight to 0.02 part by weight or 0.008 part by weight to 0.015 part by weight, based on 100 parts by weight of the mixture. By adjusting the content of the catalyst within the above-described range, a polymerization reaction of the polyurethane resin may be effectively promoted, and the polyurethane resin may be polymerized at a relatively low temperature.

According to an exemplary embodiment of the present invention, the polymerization reaction of the polyurethane resin may be carried out in an organic solvent. When an aqueous solvent is used in order to prepare a thermoplastic polyurethane film, urethane particles need to be processed in the form of beads having a diameter ranging from dozens of nanometers to hundreds of nanometers and dispersed on an aqueous solvent. In this case, since additives such as various surfactants and monomers need to be used in order to effectively disperse urethane particles on an aqueous solvent, there are problems in that a process of preparing the thermoplastic polyurethane film becomes complicated, and preparation time and preparation cost thereof are increased.

In contrast, according to an exemplary embodiment of the present invention, since the polyurethane resin is in a state of being dissolved in the organic solvent, a dispersion stabilizer-based additive such as an additional dispersant and a surfactant need not be added to the polyurethane resin composition. Accordingly, preparation time and preparation cost of the thermoplastic polyurethane film may be reduced.

According to an exemplary embodiment of the present invention, a content of the organic solvent may be 30 parts by weight to 80 parts by weight based on 100 parts by weight of the polyurethane resin. By adjusting the content of the organic solvent within the above-described range, it is possible to suppress a phenomenon that the polyurethane resin composition is rapidly dried in a step of heat-treating the polyurethane resin composition, so that the organic solvent is swollen, and it is possible to prevent the thickness of the thermoplastic polyurethane film from being reduced.

According to an exemplary embodiment of the present invention, a composition including a polyurethane resin and an organic solvent may be prepared by allowing the mixture to react in an organic solvent, and the polyurethane resin composition may be prepared by adding a first isocyanate-based curing agent to the composition. That is, the organic solvent of the polyurethane resin composition may be an organic solvent which is used during the preparation of the polyurethane resin and remains.

According to an exemplary embodiment of the present invention, the polyurethane resin may have the weight average molecular weight of 40,000 g/mol to 70,000 g/mol. By adjusting the number average molecular weight of the polyol, the number of carbon atoms of the diol used as the chain extender, the content of the polyol in the mixture, the content of the chain extender, the content of the second isocyanate-based curing agent, and the like, the weight average molecular weight of the polyurethane resin may be controlled. By adjusting the weight average molecular weight of the polyurethane resin, physical properties of the thermoplastic polyurethane film such as tensile strength and durability may be easily controlled.

According to an exemplary embodiment of the present invention, a method of applying the polyurethane resin composition onto a substrate film is not particularly limited, and for example, it is possible to use any one method of bar coating, blade coating, slot die coating, spray coating, spin coating, and gravure coating.

According to an exemplary embodiment of the present invention, the polyurethane resin composition may be applied to a thickness of 20 μm to 500 μm on the substrate film. A polyurethane resin layer having a thickness of 10 μm to 250 μm may be formed by heat-treating the polyurethane resin composition applied on the substrate film. In the process of heat-treating the polyurethane resin composition, the thickness of the prepared polyurethane resin layer may be reduced as the organic solvent included in the polyurethane resin composition is volatilized. Accordingly, the thickness of the polyurethane resin composition applied on the substrate film may be adjusted in consideration of the thickness of the polyurethane resin layer that is reduced as the organic solvent is volatilized.

According to an exemplary embodiment of the present invention, a thermoplastic polyurethane resin layer may be formed by heat-treating the polyurethane resin composition applied on the substrate film at a temperature of 100° C. to 150° C. By heat-treating the polyurethane resin composition within the above-described temperature range, the organic solvent included in the polyurethane resin composition may be effectively volatilized, thereby forming a semi-cured polyurethane resin layer. Further, by heat-treating the polyurethane resin composition within the above-described temperature range, it is possible to suppress a yellowing phenomenon from occurring in the polyurethane resin layer.

According to an exemplary embodiment of the present invention, the polyurethane resin layer may be additionally cured at a temperature of 25° C. to 40° C. for 48 hours to 72 hours. Since a polyurethane resin layer formed by heat-treating the polyurethane resin composition is in a semi-cured state, a finally cured thermoplastic polyurethane film may be prepared by additionally curing the polyurethane resin layer.

In the process of additionally curing the polyurethane resin layer, a polyurethane resin included in the polyurethane resin layer and the first isocyanate-based curing agent may react with each other, or small amounts of the polyol, the chain extender, the first isocyanate-based curing agent, and the second isocyanate-based curing agent, which remain, may react with one another, thereby providing a thermoplastic polyurethane film including a polyurethane resin having an increased weight average molecular weight.

According to an exemplary embodiment of the present invention, the polyurethane resin and the first isocyanate-based curing agent may effectively react with each other by additionally curing the polyurethane resin layer under the above-described temperature and time conditions.

According to an exemplary embodiment of the present invention, the thermoplastic polyurethane film may have a thickness of 10 μm to 250 μm. Specifically, the thermoplastic polyurethane film may have a thickness of 20 μm to 200 μm, or 30 μm to 180 μm.

According to an exemplary embodiment of the present invention, the method may further include, after the additionally curing of the polyurethane resin layer, removing the substrate film. That is, through the method for preparing a thermoplastic polyurethane film, a laminate in which a thermoplastic polyurethane film is laminated on a substrate film may be prepared, and a thermoplastic polyurethane film having low stress at an initial elongation may be provided by removing the substrate film.

MODE FOR INVENTION

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to the person with ordinary skill in the art.

Example 1

Preparation of Polyurethane Resin Composition

Polycarbonatediol (PCDL, Asahi Kasei Chemicals Corporation) having a number average molecular weight of 2,050 g/mol as a polyol, 1,4-butanediol (1,4BD, manufactured by BASF SE) as a chain extender, H12MDI (manufactured by Evonik Industries) including two isocyanate functional groups as a first isocyanate-based curing agent, isophorone diisocyanate (IPDI, manufactured by Evonik Industries) as a second isocyanate-based curing agent, dibutyltin dilaurate (DBTDL) as a catalyst, and methyl ethyl ketone as an organic solvent were prepared. Thereafter, a mixture in which a content of the polyol was about 70.03 wt %, a content of the chain extender was about 6.64 wt %, and a content of the second isocyanate-based curing agent was about 23.33 wt % was prepared, and a mixed solution was prepared by mixing 100 parts by weight of the mixture and about 50 parts by weight of the organic solvent.

The prepared mixed solution was charged into a reactor and warmed to 55° C., and 0.005 part by weight of the catalyst was added to 100 parts by weight of the mixture while maintaining the temperature. Thereafter, a composition including a polyurethane resin having the weight average molecular weight of about 51,000 g/mol was prepared by allowing the resulting mixture to react at 57° C. for 25 hours. Thereafter, by adding about 3 parts by weight of the first isocyanate-based curing agent based on 100 parts by weight of the prepared polyurethane resin to the composition, a polyurethane resin composition was prepared. A content of a solid content of the prepared polyurethane resin composition was about 45%.

Preparation of Thermoplastic Polyurethane Film

The prepared polyurethane resin composition was applied to a thickness of about 200 μm onto a polyethylene terephthalate (PET) film which is a substrate film. Thereafter, by heat-treating the polyurethane resin composition at 100° C., a polyurethane resin layer was formed, and by additionally curing the polyurethane resin layer at 40° C. for 48 hours, a thermoplastic polyurethane film having a thickness of 95 μm was finally prepared.

Examples 2 to 5

A thermoplastic polyurethane film was prepared in the same manner as in Example 1, except that in order to prepare a polyurethane resin composition, a polyol, a chain extender, a first isocyanate-based curing agent, a second isocyanate-based curing agent, and a catalyst were used as in the following Table 1. In the following Table 1, TKA-100 is a trifunctional isocyanate-based curing agent manufactured by Asahi Kasei Chemicals Corporation.

Comparative Example 1

A thermoplastic polyurethane film was prepared in the same manner as in Example 1, except that in order to prepare a polyurethane resin composition, a polyol, a chain extender, a first isocyanate-based curing agent, a second isocyanate-based curing agent, and a catalyst were used as in the following Table 1. In the following Table 1, MHG-80B is a hexafunctional isocyanate-based curing agent manufactured by Asahi Kasei Chemicals Corporation.

TABLE 1

| | Polyol (wt %) | Chain extender (wt %) | Second isocyanate-based curingagent (wt %) | Catalyst (parts by weight) * Based on 100parts by weight of mixture | First isocyanate-based curing agent (parts by weight) * Based on 100 parts by weight of polyurethane resin | Semi-cured urethane composition Solid content (%) | Polyurethane resin Mw (g/mol) |
|---|---|---|---|---|---|---|---|
| Example 1 | PCDL (70.03) | 1,4BD (6.64) | IPDI (23.33) | DBDTL (0.005) | H12MDI (3) | 45 | 52,000 |
| Example 2 | PCDL (70.03) | 1,4BD (6.64) | IPDI (23.33) | DBDTL (0.005) | H12MDI (5) | 46 | 52,000 |
| Example 3 | PCDL (70.03) | 1,4BD (6.64) | IPDI (23.33) | DBDTL (0.005) | H12MDI/TKA100 (3/1) | 45 | 52,000 |
| Example 4 | PCDL (74.08) | 1,4BD (5.34) | IPDI (20.58) | DBDTL (0.005) | H12MDI (3) | 46 | 51,000 |
| Example 5 | PCDL (74.08) | 1,4BD (5.34) | IPDI (20.58) | DBDTL (0.005) | H12MDI/TKA100 (3/1) | 46 | 51,000 |
| Comparative Example 1 | PCDL (52.61) | 1,4BD (12.33) | IPDI (35.06) | DBDTL (0.005) | MHG-80B (5) | 45 | 51,000 |

Measurement of Tensile Strength of Thermoplastic Polyurethane Film

In order to measure a tensile strength of a thermoplastic polyurethane film, samples were manufactured by processing the thermoplastic polyurethane films prepared in Examples 1 to 5 and Comparative Example 1 in accordance with ASTM D-638 standard. Thereafter, by using an ultimate tensile machine (UTM) (Model 3343, manufactured by INSTRON Corp.), an end of the sample was fixed and the other end was pulled at a rate of 300 mm/min, and a tensile strength according to the degree to which the thermoplastic polyurethane film was elongated was measured.

The tensile strengths according to the elongations with respect to the thermoplastic polyurethane films prepared in Examples 1 to 5 and Comparative Example 1 are shown in the following Table 2.

TABLE 2

| | Tensile strength (MPa) | |
|---|---|---|
| | Elongation of 5% | Elongation of 10% |
| Example 1 | 0.29 | 1.10 |
| Example 2 | 0.36 | 1.21 |
| Example 3 | 0.46 | 1.50 |
| Example 4 | 0.24 | 0.44 |
| Example 5 | 0.27 | 0.50 |
| Comparative Example 1 | 1.18 | 2.01 |

Referring to Table 2, it was confirmed that the thermoplastic polyurethane films prepared in Examples 1 to 5 of the present invention satisfied a tensile strength of 0.2 MPa to 1.5 MPa at an initial elongation of 5% to 10%. Specifically, it was confirmed that the thermoplastic polyurethane films prepared in Examples 1 to 5 of the present invention satisfied a tensile strength of 0.2 MPa to 0.5 MPa at an elongation of 5%, and a tensile strength of 0.4 MPa to 1.5 MPa at an elongation of 10%. In contrast, it was confirmed that the thermoplastic polyurethane film prepared in Comparative Example 1 had a tensile strength of more than 1.5 MPa at an elongation of 10%. Further, it was confirmed that the thermoplastic polyurethane film prepared in Comparative Example 1 had a tensile strength of more than 0.5 MPa at an elongation of 5%.

Accordingly, it can be seen that the thermoplastic polyurethane film according to an exemplary embodiment of the present invention has excellent processability due to a low tensile strength at an initial elongation.

The invention claimed is:

1. A thermoplastic polyurethane film comprising: a cured product of a polyurethane resin composition wherein the polyurethane resin composition comprises a polyurethane resin, a first isocyanate-based curing agent, and an organic solvent, wherein the polyurethane resin is a copolymer of a mixture comprising: a polyol having a number average molecular weight of 1,800 g/mol to 2,200 g/mol; a chain extender comprising a diol having 4 to 10 carbon atoms; and a second isocyanate-based curing agent; wherein the thermoplastic polyurethane film has a tensile strength of 0.2 MPa to 1.5 MPa at an initial elongation of 5% to 10%, and wherein the thermoplastic polyurethane film has a thickness of 10 μm to 250 μm, wherein a content of the polyol is 60 wt % to 75 wt % based on the weight of the mixture, wherein a content of the chain extender is 5 wt % to 10 wt % based on a weight of the mixture, and wherein a content of the second isocyanate-based curing agent is 20 wt % to 30 wt % based on a weight of the mixture.

2. The thermoplastic polyurethane film of claim 1, wherein a content of the first isocyanate-based curing agent is 2.5 parts by weight to 5 parts by weight based on 100 parts by weight of the polyurethane resin.

3. The thermoplastic polyurethane film of claim 1, wherein the first isocyanate-based curing agent comprises two to six isocyanate functional groups.

4. The thermoplastic polyurethane film of claim 1, wherein a content of a solid content of the polyurethane resin composition is 20% to 70%.

5. A method for preparing the thermoplastic polyurethane film according to claim 1, comprising: preparing a polyurethane resin composition comprising: a polyurethane resin, a first isocyanate-based curing agent, and an organic solvent; forming a polyurethane resin layer by applying the polyurethane resin composition onto a substrate film and heat-treating the polyurethane resin composition to form a polyurethane resin layer; and additionally curing the polyurethane resin layer to form the thermoplastic polyurethane film wherein the polyurethane resin is prepared by carrying out a copolymerization reaction of a mixture, wherein the mixture comprises: a polyol having a number average molecular weight of 1,800 g/mol to 2,200 g/mol; a chain extender comprising a diol having 4 to 10 carbon atoms; and a second isocyanate-based curing agent, in an organic solvent.

6. The method of claim 5, wherein the heat treating is carried out at a temperature of 100° C. to 150° C.

7. The method of claim 5, wherein the additional curing is carried out at a temperature of 25° C. to 40° C. for 48 hours to 72 hours.

8. The method of claim 5, wherein the copolymerization reaction is carried out at a temperature of 50° C. to 70° C.

9. The thermoplastic polyurethane film of claim 1, wherein a content of the polyol is 70 wt % to 75 wt % based on the weight of the mixture.

10. The thermoplastic polyurethane film of claim 9, wherein a content of the chain extender is 5 wt % to 7.5 wt % based on a weight of the mixture.

* * * * *